United States Patent [19]
Maecker

[11] 3,911,399
[45] Oct. 7, 1975

[54] DIGITAL INCREMENTAL EMITTER, ESPECIALLY FOR NUMERICAL CONTROL OF MACHINE TOOLS

[76] Inventor: Kurt Maecker, Kreuzstrasse 34, 4 Dusseldorf, Germany

[22] Filed: Nov. 14, 1972

[21] Appl. No.: 306,278

Related U.S. Application Data

[63] Continuation-in-part of Ser. No. 72,766, Sept. 16, 1970, abandoned.

[30] Foreign Application Priority Data

Jan. 31, 1970 Germany ............................ 2004396

[52] U.S. Cl. ................ 340/164 R; 328/133; 328/92
[51] Int. Cl. ............................................ H04b 3/04
[58] Field of Search .......... 340/164, 168, 146.1 AB, 340/207 P; 328/92, 120, 133; 235/92 EC, 92 EV

[56] References Cited

UNITED STATES PATENTS

| | | | |
|---|---|---|---|
| 3,364,469 | 1/1968 | Long | 340/164 X |
| 3,482,132 | 12/1969 | Emde | 328/133 X |
| 3,500,023 | 3/1970 | Arrowood et al. | 235/92 EV |
| 3,517,322 | 6/1970 | Lay | 328/133 |
| 3,529,290 | 9/1970 | Schroeder et al. | 340/146.1 AB |
| 3,560,862 | 2/1971 | Kamachi | 328/133 X |
| 3,588,710 | 6/1971 | Masters | 328/133 |
| 3,597,552 | 8/1971 | Goto | 179/69.5 R |
| 3,617,905 | 11/1971 | Castelli | 328/120 |
| 3,638,186 | 1/1972 | Schwefel | 235/92 EC |
| 3,683,345 | 8/1972 | Faulkes et al. | 235/92 EV |

*Primary Examiner*—Donald J. Yusko
*Attorney, Agent, or Firm*—Walter Becker

[57] ABSTRACT

A pulse emitter or resolver and a circuit connected thereto for use in numerical control systems such as for machine tools, in which the emitter supplies at least two trains of pulses shifted 90 electrical degrees relative to each other and which pulses are processed in the circuit so as to provide a count upon the occurrence of a pulse in either train of pulses while the circuit provides an output signal in response to the absence of a pulse in either train of pulses with the output signal adapted to actuate a signalling device and/or halt the machine controlled by the systems.

10 Claims, 10 Drawing Figures

DIGITAL INCREMENTAL EMITTER, ESPECIALLY FOR NUMERICAL CONTROL OF MACHINE TOOLS

This is a continuation-in-part of co-pending application Ser. No. 72,766—Maecker filed Sept. 6, 1970.

The present invention relates to a digital rotation control device operable by increments, especially for the numerical control of machine tools, which device for indicating the direction furnishes two signal pulses which are phase displaced electrically with regard to each other by 90°. Digitally operating rotation control devices are known, for instance optical rotation control devices, which take advantage of the photo-electric effect of photo diodes and in which by means of hairline discs and correspondingly designed orifices a periodical bright-dark is produced, or inductive rotation control devices in which Hall generators are affected by magnetic fields in a corresponding manner.

These digital-incremental rotation control devices have the considerable drawback that errors in the pulse generation cannot be recognized. It may thus occur that the machine continues its movement without a correct counting.

It is, therefore, an object of the present invention to provide an arrangement which will test the pulse generation of a digital-incremental rotation control device and which will provide a timely indication of any possible errors.

Because only a very short control time is available for the testing operation of the machine-tool digital increments can be realized only by the provision of integrated control circuits.

Assuming that the rotation control device at a speed of 50 revolutions per second will send out 1000 pulses per revolution, the duration of each individual pulse would amount only to 20 microseconds. This means that there remains only about one fourth of this time for a control or test. The present invention takes advantage of the two pulses which are furnished by a direction recording digital-incremental rotation control device for controlling the signal generation.

Figure 1:
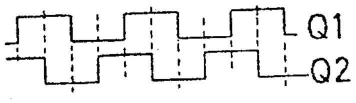

The invention is illustrated by way of example in the accompanying drawings, in which:

FIG. 1 indicates the pulse sequence of a normal digital-incremental rotation control device with direction recording.

Figure 2:
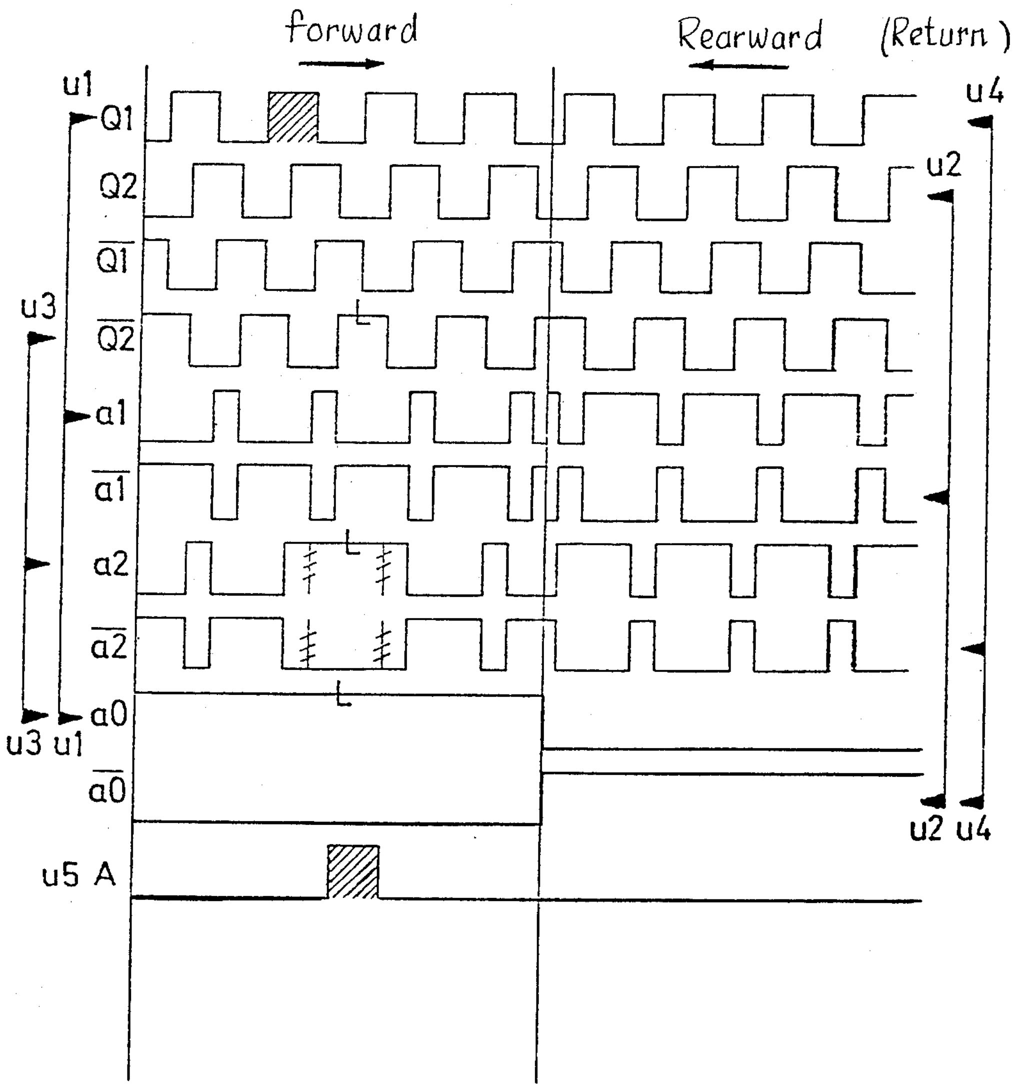

FIG. 2 shows the pulse sequence of the rotation control device according to the invention.

Figure 3:
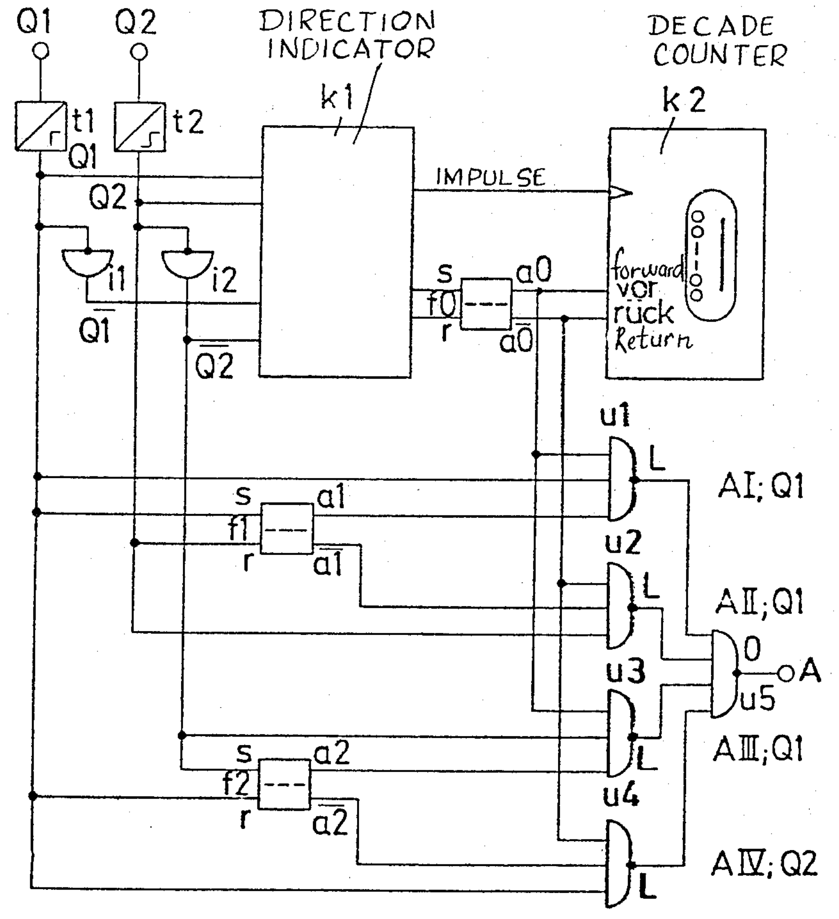

FIG. 3 indicates the pertaining evaluation.

FIGS. 4–7 illustrate the pulse sequence of the device with a special testing system according to the invention.

Figure 4:
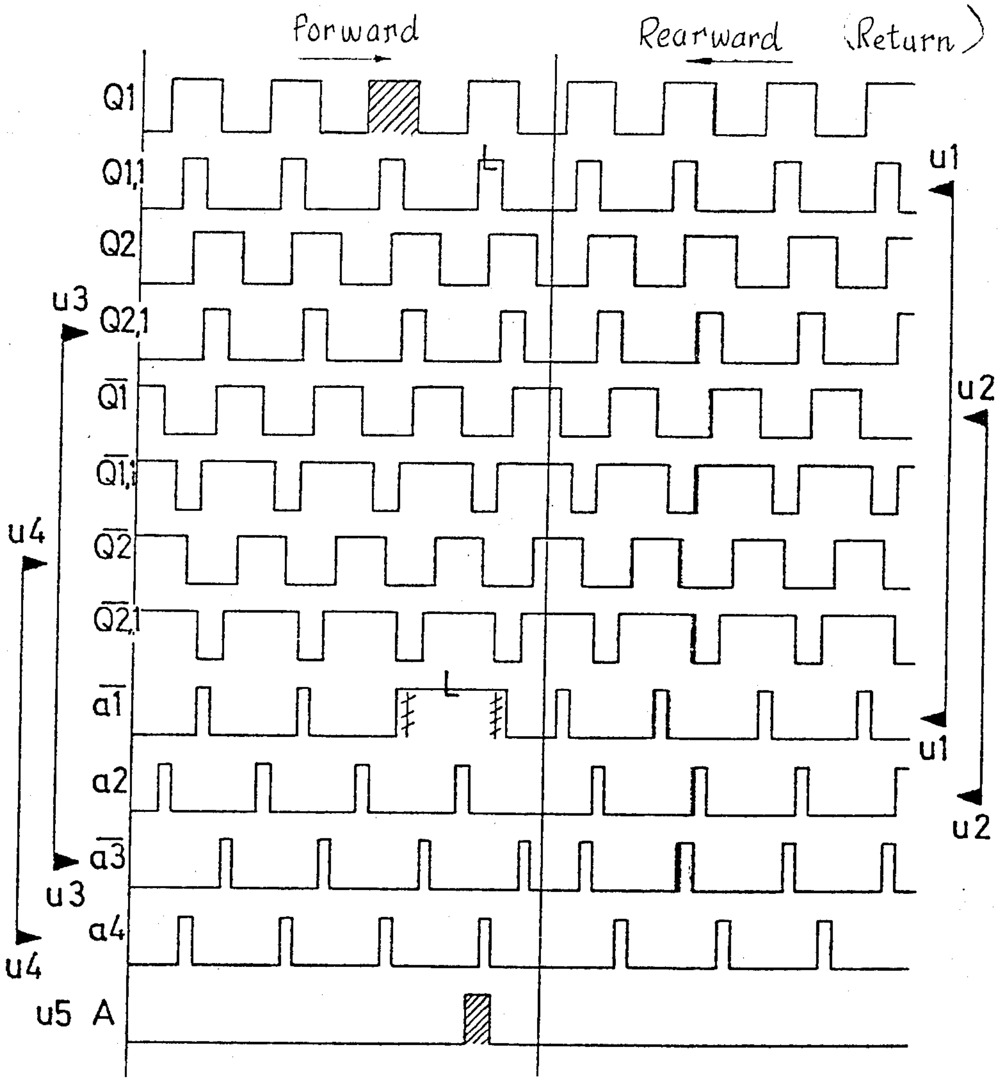
Figure 5:
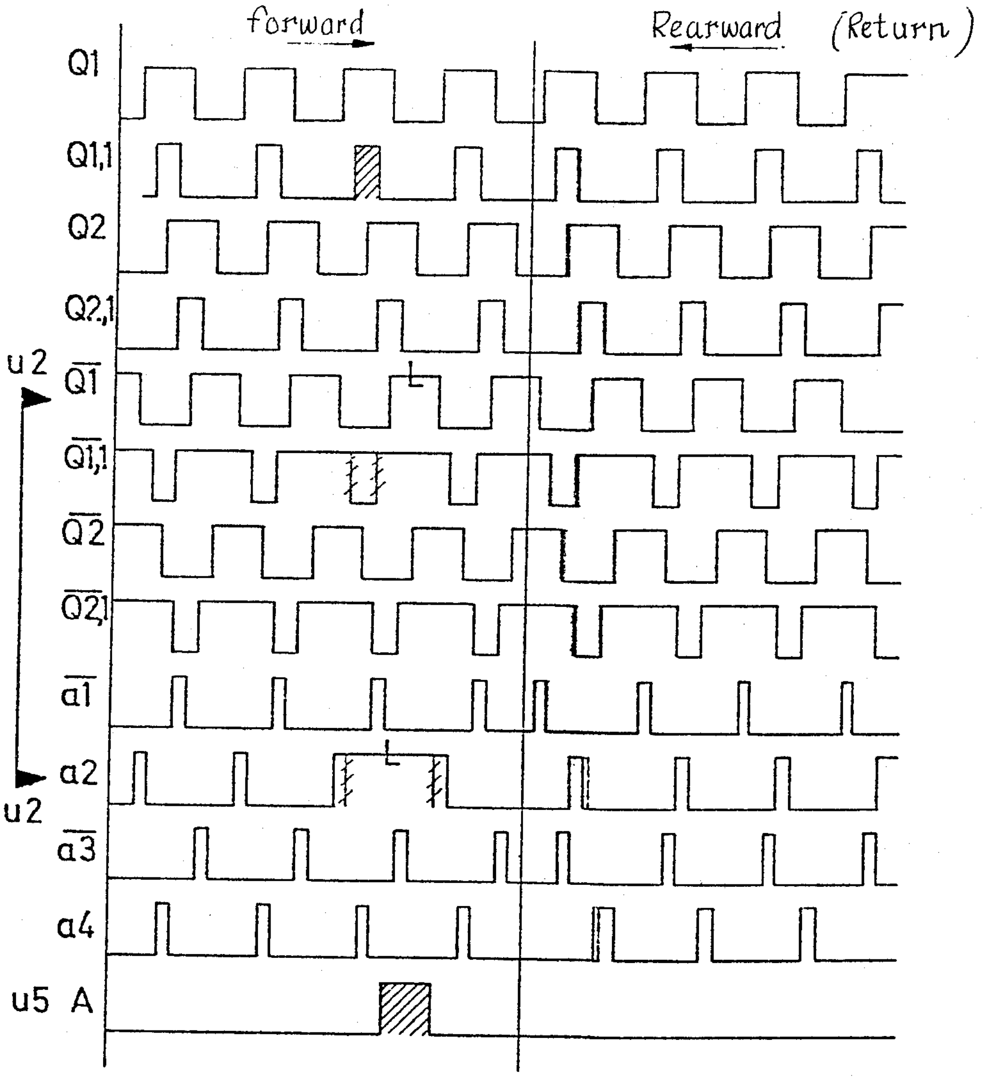
Figure 6:
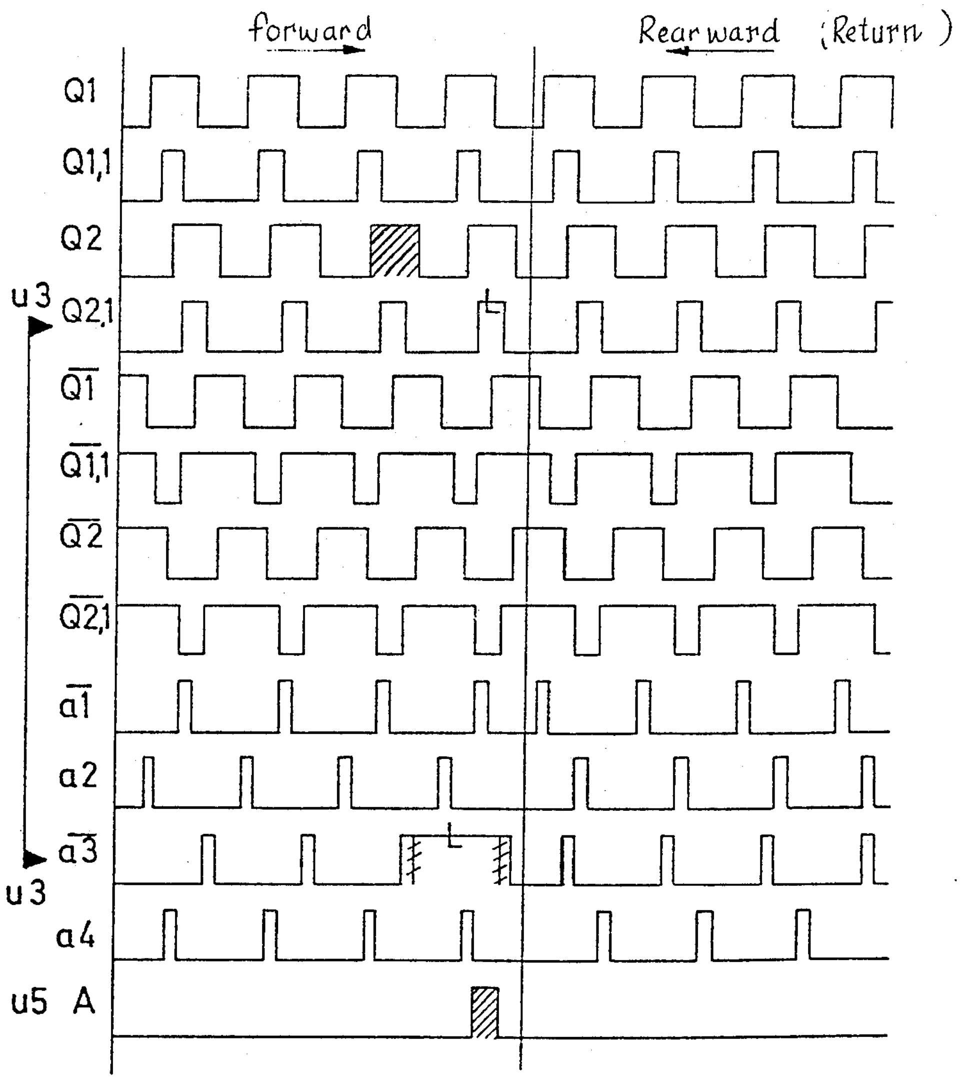
Figure 7:
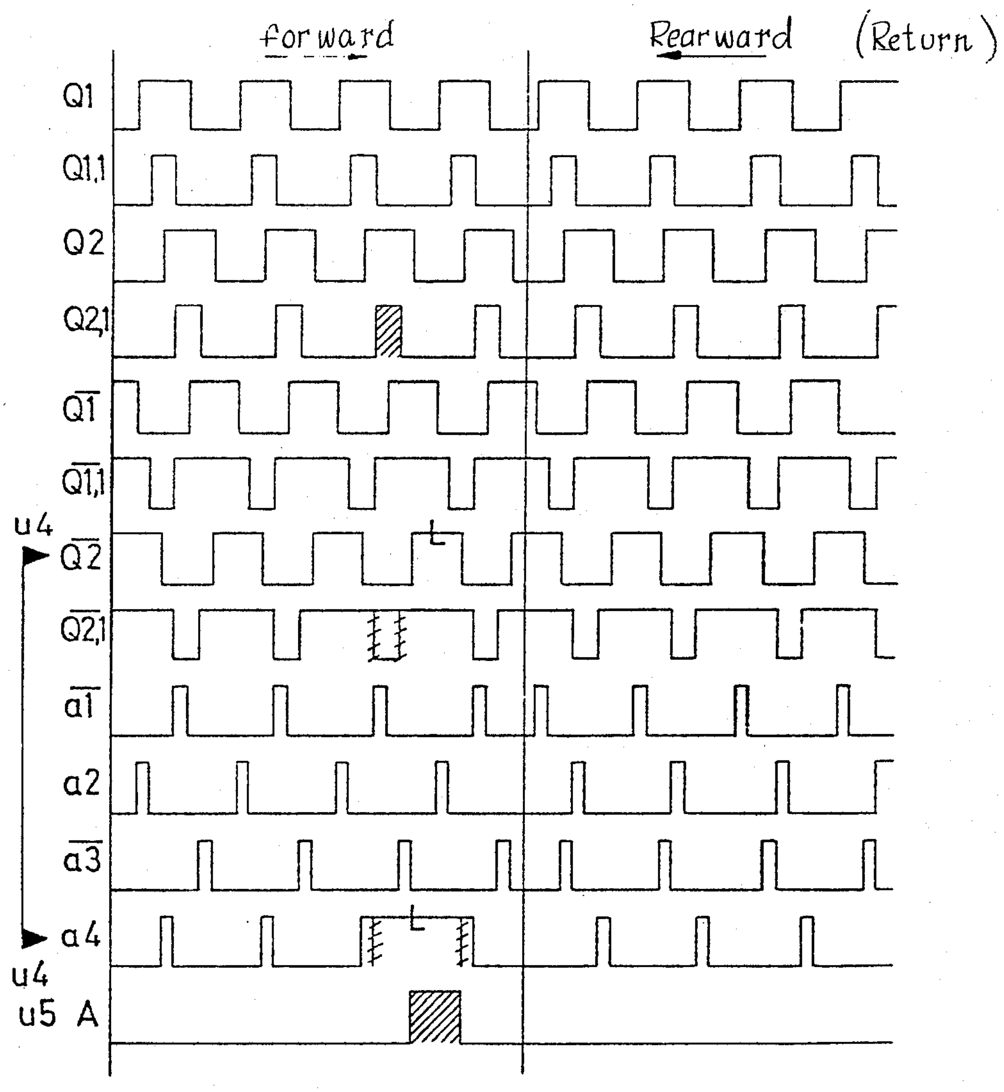
Figure 8:
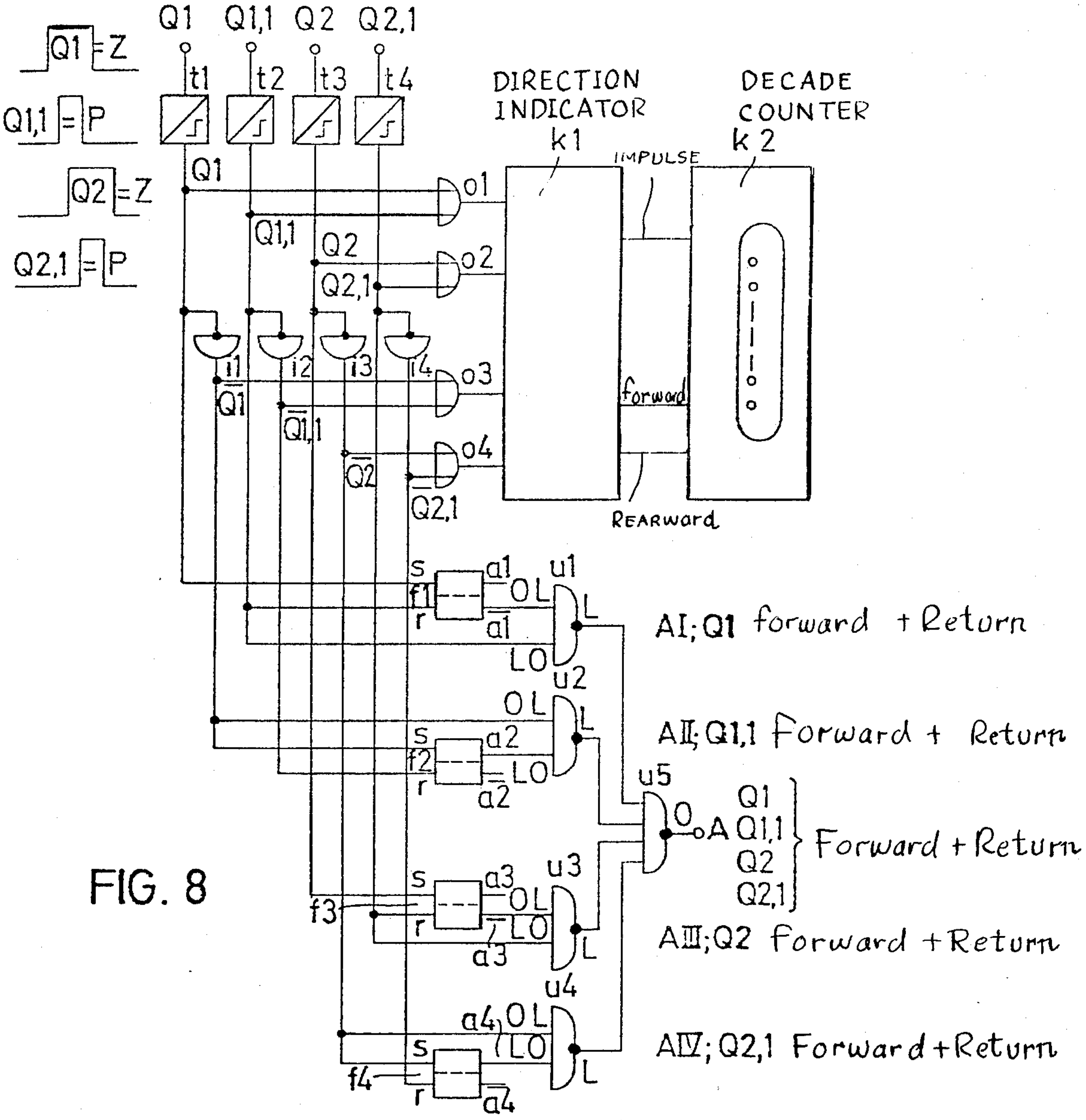

FIG. 8 indicates the evaluation for the errors reported according to FIG. 4.

Figure 9A:
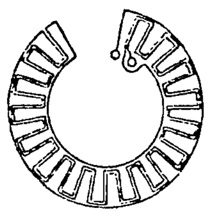

FIG. 9*a* illustrates the indictivity sample (coils) of the rotation control device according to the invention.

Figure 9B:
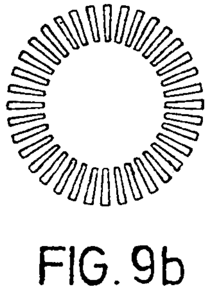

FIG. 9*b* shows the associated rotor plate.

The present invention is characterized primarily in that the two generated signals are employed for a mutual control of a correct pulse generation while an evaluation system alternately deals with the two signals and produces an error indicating signal if one signal is lacking.

Therefore, one signal must always be followed by the next signal which has a phase displacement of 90°. This evaluation system may be mounted in the generator or in the counter. If one of the two signals is lacking, an error signal will be produced.

It may also happen that several pulses fail and that consequently the counting does not preceed properly correspond to the position of the machine part. This will always occur when an ordinary pulse system is used for testing purposes as will be shown further below in greater detail in connection with FIGS. 1 and 2.

According to another embodiment of the invention, therefore, two pulse systems with two pulse rows displaced by 90° (counting system and testing system) are employed which test each other, while one of the pulse systems maintains the correct counting in case of an error.

According to a special design of the invention, the second pulse system (testing system) of the rotation control devices has an off-on ratio which differs from the first mentioned pulse system.

If, for instance, an ordinary digital-incremental rotation control device has two outputs which are electrically displaced by 90° for indicating the direction, these two outputs have a symmetrical OFF-ON ratio which means that the pulse duration and the pulse gap of each individual pulse are of equal length. These pulses will henceforth be designated as counting pulses.

The second pulse system for testing has, however, a different OFF-ON ratio, which means that the pulse duration lasts only 25% whereas the pulse gap lasts 75%. This pulse sequence is designated as testing pulses. This reduction in the pulse duration of the counting pulses with regard to the testing pulses is necessary in order to assure a safe separation of the two types of pulses.

By means of a corresponding evaluation system it is possible to ascertain the lack of a counting or a testing pulse.

In order to be able economically to produce a rotation control device, resolver or emitter and to keep its dimensions within tolerable values, the rotation control device may consist of two circular printed-conductor plates. One conductor plate which is stationary contains inductances in the form of printed conductor path patterns. On the other rotatable plate (rotor plate), there are provided conductive or magnetic fields in the form of metallic springs, the number of which corresponds to the number of the signal voltage periods (pulses) per revolution.

During the rotation of the rotor disc, the inductances on the stationary disc are periodically changed. The variable inductances are designed as non-crossing conductor path patterns and are extended along the circular circumference to such an extent that they will be simultaneously affected by a plurality of or by all metallic springs of the rotor plate.

In this connection the coils as well as the dampening discs may be made in the manner of printed cards, and two complete systems can be installed in one housing, one behind the other. A further possibility is that the additional testing systems can be placed on the same coil plate if the operational coil systems do not take up more than 180° of the plate. In this way, it will be possible to place the double coil system with the corresponding amplifying elements on one plate. For dampening these coils, only one disc with metal segments is necessary.

The evaluation system itself may be mounted in the generator or also in the counter $k_1/k_2$ thereby to eliminate disturbing influence through the conductors from the generator to the counter.

It may be added that the evaluation system will, of course, also operate in the same manner when, instead of a missing pulse, one pulse too many is generated due to other disturbing influences as far as these influences are non-symmetrical.

Referring now to the drawings in detail, FIG. 1 indicates the two pulses which have been designated $Q_1$ and $Q_2$, $Q_2$ being electrically displaced by 90° with regard to $Q_1$.

In FIG. 2 the signals employed in conformity with the present invention are the signals $\overline{Q}_1$ and $\overline{q}_2$, which are the inverse signals of $Q_1$, $Q_2$. The signals $a_0$, $a_1$, $a_2$ and the inverse signals of $\overline{a}_0$, $\overline{a}_1$, $\overline{a}_2$ are outputs of the flipflops $f_0$ to $f_2$. Elements $u_1$ to $u_5$ are NAND gates. The vertical lines on the left and right side of the signals illustrate the interconnection of the individual signals with the corresponding NAND gate.

FIG. 3 shows the circuit system belonging to FIG. 2. In this connection only the edge of the pulse is employed for measuring and, more specifically, the edge which occurs when it drops from the value L to the value O.

With the error example of FIGS. 2 and 3, the second $a_2$ pulse signal will not be dropped to O and will remain at L when the second $Q_1$ pulse signal is lacking. During the next 90° step, the inverse $\overline{Q}_2$ signal attains L, and the direction flipflop $f_0$ will likewise have an L signal at the output $a_0$. The and-condition at the NAND gate $u_3$ is given, and at its output AIII there will appear an O signal, which at the output A of the NAND gate $u_5$ will produce an L signal.

In the same manner, for instance during a backward running condition and when a signal $Q_2$ is missing, the evaluating system would cause an error signal to appear at the output A.

In this instance, the above referred to embodiment is involved, according to which the counting no longer corresponds to the position of the machine part when several pulses are lacking.

In FIG. 3, $t_1$ and $t_2$ indicate the input stages for the transformation of the signal coming from the rotation control device. $i_{1, 2}$ are reversing members for producing the inverse signal $\overline{Q}_1$, $\overline{Q}_2$, and $f_0$ to $f_2$ are flipflops, $u_1$ to $u_5$ are NAND gates.

In conjunction with the means designated by reference $k_1$ such as recognizable from U.S. Pat. No. 3,517,322—Lay issued June 23, 1970, there is present the customary circuit for the direction discrimination (direction indication) and the electronic amplification of the input pulses. The reference $k_2$ designates a decade counter means for forward and backward counting, commercially available from Digital Equipment Company of Maynard, Mass.

FIGS. 4 to 7 illustrate the pulse sequence of the device with the additional testing system according to the invention. Added are the checking pulses $Q_{1.1}$, $Q_{2.1}$. In the individual figures, the absence of one counting or testing signal and the resulting influence on the corresponding NAND gate $u_1$ to $u_3$ has been shown. Only the changes of the signals are shown which become effective for indicating the error. The circuit of FIG. 8 pertains to FIGS. 4 to 7.

In FIG. 4, all NAND gate connections $u_1$ to $u_5$ are shown and, more specifically, are provided with arrows where they would become effective. In FIGS. 4 to 7, only that NAND gate on the left-hand side is shown which becomes effective for reporting the disturbance.

If, in the evaluating system according to FIG. 4, the third $Q_1$ pulse counting signal is not present, during operation of the flipflop $f_1$, output $\overline{a}_1$ is not dropped to O-signal. The respective next L signal timewise coincides with the fourth $Q_{1.1}$ pulse signal, so that at the NAND gate $u_1$, the and-condition is given. At the output of $u_1$ there appears an O signal which produces an L signal at the output A of the NAND gate $u_5$.

If the third $Q_{1.1}$ pulse checking signal is lacking (FIG. 5), during operation of the flipflop $f_2$ (FIG. 8), the output $a_2$ is not dropped to O-signal level. The respective next L-signal will then timewise coincide with the third $\overline{Q}_1$ L signal, so that at the NAND gate $u_2$, the and-condition will be given.

If the third $Q_2$ pulse counting signal (FIG. 6) is lacking, during operation of the flipflop $f_3$ (FIG. 9) the output $a_3$ is not dropped to O-signal level. The respective next L signal will then timewise coincide with the fourth $Q_{2.1}$ signal so that, at the NAND gate $u_3$, the and-condition occurs.

If the third $Q_{2.1}$ pulse checking signal is missing (FIG. 7), during operation of the flipflop $f_4$ the output $a_4$ is not dropped to O-signal level. The respective next L signal will then timewise coincide with the third $\overline{Q}_2$ L signal so that, at the NAND gate $u_4$, the and-condition occurs.

The control is effected in the same way when the rotation control device rotates in the opposite direction, i.e. with the signal row which is designated "return".

FIG. 8 shows the evaluation system for the indication of an error and pertains to FIGS. 4 to 7. In this connection the signal sequences have been designated with $Q_1$, $Q_{1.1}$, $Q_2$, $Q_{2.1}$.

$t_1$ to $t_4$ again represent the input members for the transformation of the signals $Q_1$ to $Q_{2.1}$.

$i_1$ to $i_4$ are the reversing members, whereas $u_1$ to $u_5$ represent the NAND gates for the error report.

$f_1$ to $f_4$ are flipflops. $O_1$ to $O_4$ are OR members for the continuation of the counting or testing signal as counting signal.

When a counting pulse is missing, an error signal will by means of the evaluation system appear at the output A of the NAND gate $u_5$. However, in conformity with the present invention, a correct counting is continued inasmuch as now, instead of the counting pulse, the testing pulse is available for the counting A counting signal and the associated testing signal are connected to an OR member ($O_1$, $O_2$, $O_3$, $O_4$), as for instance $Q_1$ and $Q_{1.1}$. One of the two signals is then conveyed as an effective counting signal.

If, however, inversely a testing impulse is lacking, an error signal will likewise appear at the exit A of $u_5$, but also in this instance the counting is continued. The error signal may directly act on the control of the machine or may attract the operator's attention to the fact that the device or the circuit needs to be checked. It is important that the distance to be measured or the angle was measured correctly.

FIG. 9a shows the stationary disc with the inductance pattern. This pattern consists primarily of two adjacent meander-shaped and back-and-forth extending strand of conductors which are electrically arranged in series. This pattern works in such a way that the magnetic lines of force embrace the radially extending double conductors. The inductance pattern can be designed for a sufficiently high number of periods per revolution.

The rotatable rotor disc (FIG. 9*b*) is at its circumference provided with conductive fields in the manner of windmill blades.

The control circuit according to the present invention is not limited to a rotation control device according to FIG. 9*a* and 9*b*, but may also be employed in connection with the above mentioned optical and magnetic pulse emitters (Hall-generators). In such an instance the design is somewhat more complicated and more expensive than is the case with the pulse emitter according to FIGS. 9*a* and 9*b*.

The control means in the system could naturally also function in a transverse embodiment. Thereby it would be possible, even relatively inexpensively, to have the rotational segment disc means replaced by printed-circuit segments upon a linear means in any particular suitable position. This linear means would be guided past an arrangement or system which can include either impulse systems or means which can be located upon a printed card. Then no rotational movement would be carried out but rather a sliding movement of both parts would be involved.

In place of a rotational means, there would be two plates in a transverse operating system which for instance could use a part movable in a horizontal direction or in a vertical direction and which carries segments as well as a fixed part which includes both impulse systems and which has the form of a printed card along which linear movement occurs or relative to which linear means are movable.

There is provided according to the present invention a digital-incremental control means operating as a pulse generator or resolver with numerical controls especially for machine tools. This pulse generator or resolver delivers two output signals that are phase shifted by 90° for directional recognition. Thereby two impulse systems are applied and used, namely a series for counter impulse and a series for testing impulse. Both these impulse systems have two impulse rows or series at a time which are phase shifted by 90° to each other. Both series, namely the series for counter impulse and the series for testing impulse, monitor each other for the purpose of a correct impulse generating or resolving operation at a time one of both impulse series maintains the correct counting in case of error or disturbance.

The first and second impulse systems, namely the counter system and the testing system have different feeler or sensing relationships. The evaluation logic is so constructed that both upon elimination or dropping out of the counter impulses and also during elimination or dropping out of the testing impulses, there is caused a disturbance warning or error signal.

At a time, one counter and one testing signal pertaining thereto are connected to an OR element whereby, during elimination or dropping out of a counter impulse or a testing impulse, one or both signals is supplied further as an effective counter signal.

The special characteristic for the present invention compared to prior art is emphasized in that, when a disturbance or error arises or occurs, this is not only reported from the device but also the counter operaion is further maintained. Since in the case of the invention, the concern is with a path measurement in contrast to both cited patents, this circumstance is of the greatest meaning because, upon turning off the machine in case of disturbance, if the counting were not maintained further after the disturbance or error signal, there would be a running out or stoppage and it could be no longer determined where the machine is actually located when the correct further counting discontinues or drops out.

The present invention proceeds from a path measurement, which is not the case with the references cited as a whole. Particularly for this reason, however, the fact that, in case of disturbance not only a warning signal is given but also the counting is maintained, can be taken to be of decisive meaning for the present invention while the same would be completely unimportant and not essential for the prior art.

The present invention thus pertains to a "digital incremental operating resolver for angle and path measurement for numerical control, especially of machine tools".

Reference is made again to the fact that, not only do both impulse rows or series monitor each other for the purpose of correct impulse generating or resolving, namely the series for counter impulse and a series for testing impulse, but also one of both impulse series maintains the correct counting in case of disturbance or error.

As previously mentioned, this feature is of decisive meaning for a resolver for angle and path measurement since the entire system otherwise becomes completely mixed up. The reference *k* 1 designates means which serves for directional recognition and in and of itself is known. Such a member element can be recognized from U.S. Pat. 3,517,322—Lay issued June 23, 1970. Thus, *k* L represents the counter impulse and the direction (right = +, left = —).

The element designated by *k* 2 is a decade counter with indicator tubes. Such a device is produced and delivered in quantity by Digital Equipment Company of Maynard, Massachusetts and thus this item is commercially available. FIGS. $9a_1$, $9a_2$, $9b_1$ and $9b_2$ represent another embodiment.

In summary, the features of the present invention can be set forth as follows:

There is provided a digital-incremental operating resolver for angle and path measurement for numerical control. Thereby, two independently supplied impulse systems are provided, namely, a series for counter impulse and a series for testing or monitoring impulses. Both of these impulse sytems each have two impulse series which have purposes of directional recognition are phase shifted 90° with respect to each other. Both series, namely the series for counter impulse and the series for monitoring impulse, watch over or monitor each other for the purpose of a correct impulse generating or resolving. The evaluating logic is so constructed that, both during dropping out of counter impulse and also during dropping out of monitor impulse, there is caused to occur a disturbance or error reporting, in any event one or both impulse series maintains the correct counting in case of error or disturbance. The first and the second impulse systems, namely the counter system and the monitor system have a different feeler ratio of sensing relationship. At a time one counter and one monitoring signal pertaining thereto are connected with one OR element or member whereby upon dropping out or missing of a counter impulse or a monitor impulse, one of both signals pass as an effective counter signal.

It is, of course, to be understood that the present invention, is, by no means, limited to the specific showing in the drawings but also comprises any modifications within the scope of the appended claims.

What is claimed is:

1. In combination with a digital-incremental operating resolver system for angle and path measurement with numerical controls, especially for machine tools; pulse resolver digital-incremental control means which for purposes of checking direction furnishes two signal outputs utilized for a mutual check for a correct pulse emission operable to supply independently respective series of signal pulses that are phase displaced relative to each other 90 electrical degrees, warning signal means energizable to produce an error signal, a control circuit including means operatively connected to receive said signal pulses evaluated in alternately processing the two signals and operable in the absence of one of said pulses to energize said warning signal means, with said means effectively there being two pulse systems with two pulse rows in a series of pulses each displaced by 90° used as counting pulses and as monitor pulses respectively which monitor each other while one of said series of pulses represents the counting pulses while another of said series of pulses represents the monitoring pulses, respectively one of the series of pulses maintaining correct counting in case of error, said other series of pulses for monitoring of said control means having a different keying than said one series of pulses, the absence of a pulse from either of said series of pulses being effective to bring about energization of said warning signal means, and an OR gate having input terminals to which said series of pulses are supplied, said OR gate having an output terminal providing counting pulses whereby the monitored presence of a pulse in either of said series of counting and monitor pulses respectively will produce and maintain a correct counting pulse.

2. A system in combination according to claim 1, wherein said pulse resolver control means are rotational.

3. A system in combination according to claim 1, in which said pulse resolver control means comprises a pair of relatively rotatable plate means, one of said plate means having printed circuit means thereon defining circumferentially distributed inductance means, the other of said plate means comprising circumferentially distributed magnet means operable for inducing dampening pulses in said inductance means when said plates rotate relatively.

4. A system in combination according to claim 3 in which said one plate means is a single plate and is stationary and the printed circuit means thereon defining said inductance means extends circumferentially an angular amount occupying less than 360° and provides for the supply of both of said series of pulses.

5. A system in combination according to claim 4, in which said other plate means is also only a single plate.

6. In a digital control system; pulse emitter means operable for emitting trains of first and second pulses shifted 90 electrical degrees relative to each other and varying between zero and a positive value, an inverter supplied by each train of pulses and operable to supply trains of first and second inverted pulses, a direction selector operable to supply a forward signal or a reverse signal, first and second flip flops each supplied by said first pulses and said second inverted pulses, said first flip flop having a first output which goes positive during the interval between the end of a said first pulse and the end of the next following inverted second pulse and a second output which is the inversion of the first output thereof, said second flip flop having a first output which goes positive in the interval between the beginning of a said inverted second pulse and the end of the next following first pulse and a second output which is the inversion of the first output thereof, a first NAND gate having as inputs said forward signal and said first pulses and said first output of said first flip flop, a second NAND gate having as inputs said reverse signal said second pulses and said second output of said first flip flop, a third NAND gate having as inputs said forward signal, said inserted second pulses and said first ouput of said second flip flops, a fourth NAND gate having as inputs said reverse signal and said first pulses and said second output of said second flip flops, and a fifth NAND gate having as inputs the outputs of said first, second, third and fourth NAND gates and having an output adapted for connection in controlling relation to a signal means.

7. In a digital control system; pulse emitter means operable for emitting trains of first and second pulses displaced 90 electrical degrees, said emitter means also emitting trains of third and fourth pulses shorter in duration than said first and second pulses but centered respectively relative thereto, inverter means for inverting said pulses to provide for trains of first, second, third and fourth inverted pulses, a first flip flop receiving said first and third pulses and supplying an output signal during the interval between the ends of said pulses, a second flip flop receiving said first and third inverted pulses and supplying an output signal during the interval between the ends thereof, a third flip flop receiving said second and fourth pulses and supplying an output signal during the interval between the ends thereof, a fourth flip flop receiving said second and fourth inverted pulses and supplying an output signal during the interval between the ends thereof, a first NAND gate having as inputs the output from said first flip flop and said second pulses, a second NAND gate having as inputs the output of said second flip flop and said first inverted pulses, a third NAND gate having as inputs the output from said third flip flop and said fourth pulses, a fourth NAND gate having as inputs the output of said fourth flip flop and said third inverted pulses, and a fifth NAND gate having as inputs the outputs of said first, second, third and fourth NAND gates and having an output adapted for connection in controlling relation to a signal means.

8. A digital control system according to claim 7, which includes counter means, and a pair of OR gates having outputs connected to said counter means and one having as inputs said first and second pulses and another having as inputs said third and fourth pulses.

9. A digital control system according to claim 8, which includes a third OR gate having as inputs said first and second inverted pulses, and a fourth OR gate having as inputs said third and fourth inverted pulses.

10. A digital-incremental resolver system for measurement of some machine element comprising:

A. means for receiving a first train of pulses (Q1) at cyclic intervals which depend upon the speed of movement of the machine element and for receiving a second train of pulses (Q2) having a cyclic angular displacement from the first set of pulses, said angular displacement including a quadrature component, B. measuring means responsive to the two trains of pulses for determining the direction of motion of the machine element and for determining the extent of that movement, C. means for generating a third train of pulses (Q1.1) approximately coincident with but having a different OFF-ON ratio from the pulses of the first train, D. means for generating a fourth train of pulses (Q2.1) approximately coincident with but having a different OFF-ON ratio from the pulses of the second train, E. a control circuit means for providing a warning signal when a pulse from one of the trains is absent while a corresponding but angularly displaced signal from the other of the trains is present, F. OR-gate means respectively for combining pulses of the first train with pulses of the third train, for combining pulses of the second train with pulses of the fourth train, for combining inverted pulses of the first train with inverted pulses of the third train, and for combining inverted pulses of the second train with inverted pulses of the fourth train, whereby, in each instance, if a pulse is available in either of the two trains being combined, a corresponding output pulse is available from the OR-gate means, and G. means for applying the output pulses to the measuring means, whereby the appropriate measurement of direction and extent of rotation is made even in the absence of a pulse from any of the four trains.

* * * * *